(12) United States Patent
Shi et al.

(10) Patent No.: US 7,447,013 B2
(45) Date of Patent: Nov. 4, 2008

(54) MOUNTING APPARATUS FOR STORAGE DEVICE

(75) Inventors: Zheng Shi, Shenzhen (CN); Zhi-Gang Chen, Shenzhen (CN); Ke-Cheng Lin, Shenzhen (CN); Chien-Li Tsai, Shenzhen (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 340 days.

(21) Appl. No.: 11/306,962

(22) Filed: Jan. 17, 2006

(65) Prior Publication Data
US 2006/0279925 A1  Dec. 14, 2006

(30) Foreign Application Priority Data
Jun. 10, 2005  (CN) .................... 2005 1 0035283

(51) Int. Cl.
*G06F 1/16* (2006.01)
*H05K 5/00* (2006.01)
*H05K 7/00* (2006.01)

(52) U.S. Cl. .................... 361/685; 361/683
(58) Field of Classification Search ............ 361/679, 361/683, 685; 248/552; 292/128, 107, 242; 70/57, 144

See application file for complete search history.

(56) References Cited

U.S. PATENT DOCUMENTS

| | | | | |
|---|---|---|---|---|
| 4,837,975 A * | 6/1989 | Simpson | ..................... | 49/175 |
| 4,901,475 A * | 2/1990 | Simpson | ..................... | 49/175 |
| 5,028,083 A * | 7/1991 | Mischenko | ................ | 292/175 |
| 5,465,191 A * | 11/1995 | Nomura et al. | ............. | 361/681 |
| 6,122,152 A * | 9/2000 | Goto et al. | ................... | 361/680 |
| 6,155,615 A * | 12/2000 | Schultz | ....................... | 292/175 |
| 6,230,443 B1 * | 5/2001 | Schultz | ....................... | 49/183 |
| 6,256,194 B1 * | 7/2001 | Choi et al. | ................... | 361/679 |
| 6,297,951 B1 * | 10/2001 | Lee | .............. | 361/685 |
| 6,485,070 B1 * | 11/2002 | Schultz | ....................... | 292/175 |
| RE37,916 E * | 12/2002 | Szapucki et al. | ............ | 292/175 |
| 6,535,380 B1 * | 3/2003 | Lee et al. | ..................... | 361/683 |
| 6,587,350 B1 * | 7/2003 | Lin et al. | ..................... | 361/754 |
| 6,654,239 B2 * | 11/2003 | Smith | ........................ | 361/685 |
| 6,707,665 B2 * | 3/2004 | Hsu et al. | ................... | 361/681 |
| 6,722,712 B2 * | 4/2004 | Schultz | ....................... | 292/175 |

(Continued)

FOREIGN PATENT DOCUMENTS

CN  2519315 Y  10/2002

(Continued)

*Primary Examiner*—Anatoly Vortman
*Assistant Examiner*—Adrian S Wilson
(74) *Attorney, Agent, or Firm*—Winston Hsu

(57) ABSTRACT

A mounting apparatus for a storage device includes a bracket for receiving the storage device and a base for mounting the bracket therein. A fixing portion including two sidewalls is formed on the base. A hooking recess is defined in one of the sidewalls of the fixing portion. A sliding member is received in the fixing portion for fixing the bracket, and the sliding member includes a hook to engage in the hooking recess of the fixing portion. An elastic member is received in the fixing portion for restoring the sliding member.

14 Claims, 6 Drawing Sheets

U.S. PATENT DOCUMENTS

| | | | |
|---|---|---|---|
| 6,785,141 B2 * | 8/2004 | Fang | 361/727 |
| 6,874,826 B1 * | 4/2005 | Polowinczak et al. | 292/175 |
| 6,883,272 B2 * | 4/2005 | Maier | 49/181 |
| 6,948,278 B1 * | 9/2005 | Schultz | 49/185 |
| 7,009,836 B2 * | 3/2006 | Lo | 361/683 |
| 7,009,837 B2 * | 3/2006 | Lo | 361/683 |
| 7,222,458 B2 * | 5/2007 | Polowinczak et al. | 49/181 |
| 2007/0053148 A1 * | 3/2007 | Shi et al. | 361/684 |

FOREIGN PATENT DOCUMENTS

TW  221956  10/2004

* cited by examiner

MOUNTING APPARATUS FOR STORAGE DEVICE

CROSS-REFERENCES TO RELATED APPLICATION

Relevant subject matter is disclosed in the copending U.S. patent application Ser. No. 11/306,633, filed on Jan. 5, 2006, and having a same title with the present application, which is assigned to the same assignee with this patent application.

FIELD OF THE INVENTION

The present invention relates to a mounting apparatus, and more particularly to a mounting apparatus for a storage device.

DESCRIPTION OF RELATED ART

Typically, a storage device is fixed in a portable computer by a bracket, and a fixing mechanism is provided for fixing the bracket with the storage device. A mounting apparatus for a storage device is disclosed in Taiwan Patent No. 221956, which describes a mounting apparatus including a base, a sliding member with an inclined plane, an elastic member and an operating member engaging with the sliding member. The elastic member is connected to the sliding member for pushing the sliding member to insert into a slot of a storage device bracket. A post is formed from the operating member for engaging with the inclined plane of the sliding member. When the operating member is pushed, the post pushes the inclined plane of the sliding member and makes the sliding member exit from the slot of the storage device bracket. However, the storage device is apt to be detached from the base and destroyed due to a careless operation of the operating member.

What is needed, therefore, is a mounting apparatus which is able to prevent inadvertent disengagement of a fixed storage device.

SUMMARY OF INVENTION

In one preferred embodiment, a mounting apparatus for a storage device includes a bracket for receiving the storage device and a base for mounting the bracket therein. A fixing portion including two sidewalls is formed on the base. A hooking recess is defined in one of the sidewalls of the fixing portion. A sliding member is received in the fixing portion for fixing the bracket, and the sliding member includes a hook to engage in the hooking recess of the fixing portion. An elastic member is received in the fixing portion for restoring the sliding member.

Other advantages and novel features will become more apparent from the following detailed description of a preferred embodiment when taken in conjunction with the accompanying drawings, in which:

DETAILED DESCRIPTION

Figure 1:
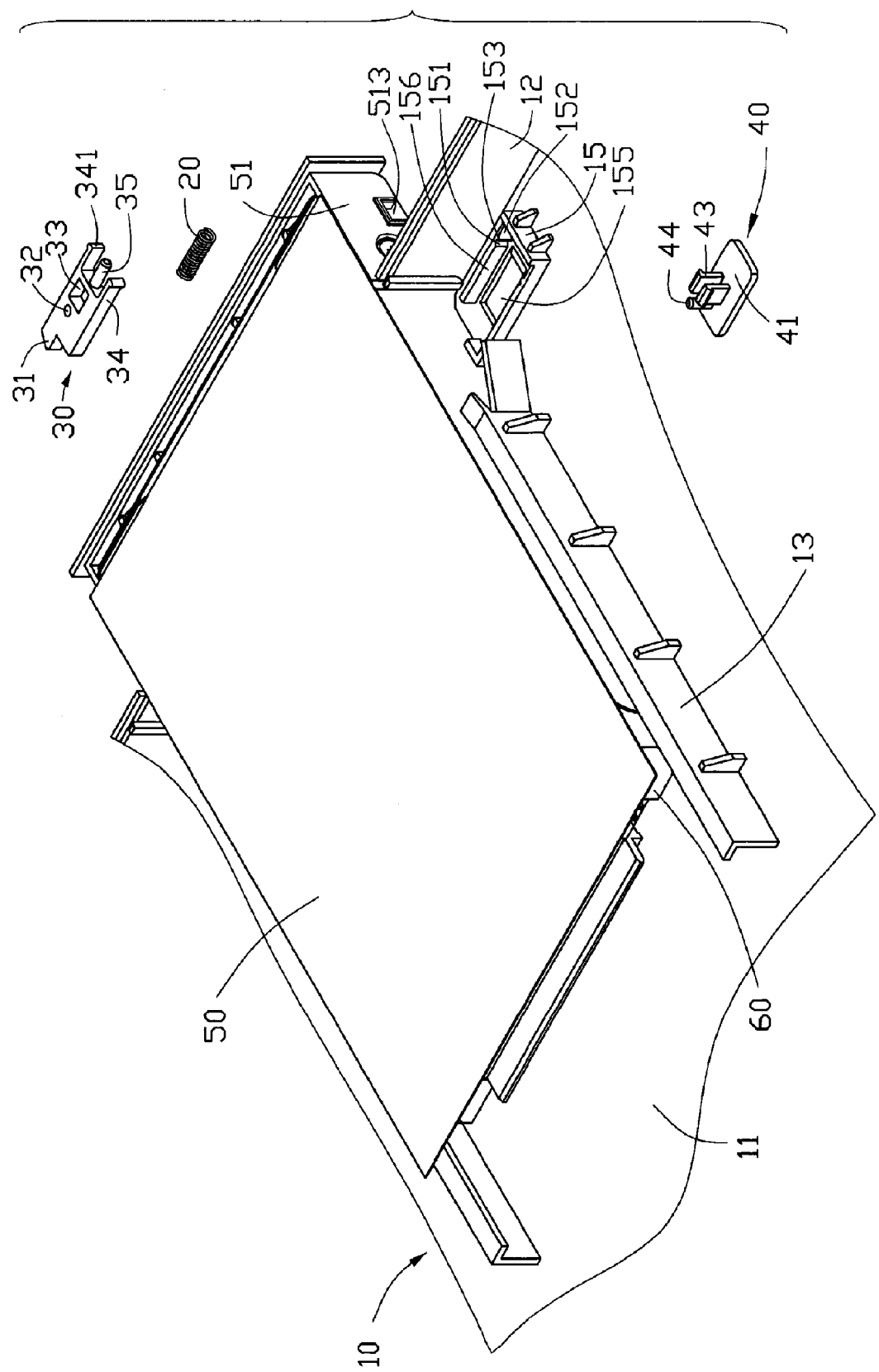
FIG. 1 is an exploded, isometric view of a mounting apparatus with a storage device in accordance with a preferred embodiment of the present invention.

Referring to FIG. 1, a mounting apparatus for a storage device is provided in accordance with a preferred embodiment of the present invention. The mounting apparatus includes a base 10, an elastic member 20, a sliding member 30, an operating member 40 and a bracket 50 for fixing a storage device 60. In this embodiment, the storage device 60 is a hard disk drive.

The base 10 includes a bottom wall 11 and an end wall 12, two spaced sliding rails 13 are formed from the bottom wall 11 for mounting the bracket 50. A generally U-shaped fixing portion 15 is formed adjacent to the end wall 12. The fixing portion 15 includes two sidewalls 156. A hooking recess 151 and a sliding recess 152 are defined in each of the sidewalls 156, and a projection 153 is formed between the hooking recess 151 and the sliding recess 152. The sliding recess 152 is adjacent to an end of the fixing portion 15. A through hole 155 is defined through the bottom wall 11 of the fixing portion 15.

The sliding member 30 includes an ejector 31 formed from an end of the sliding member 30, and two hooks 34 extended from the other end of the sliding member 30. The hooks 34 are spaced oppositely, and an end of each of the hooks 34 defines a hooking portion 341. A protruding post 35 is formed between the hooks 34 from the sliding member 30. A round hole 32 and a latching portion 33 are defined in middle of the sliding member 30.

The operating member 40 includes an operating panel 41. Two opposite latches 43 and a post 44 are formed from the operating panel 41.

The bracket 50 includes a side panel 51, a receiving portion 513 is defined in an end of the side panel 51 corresponding to the fixing portion 15 of the base 10.

Figure 2:
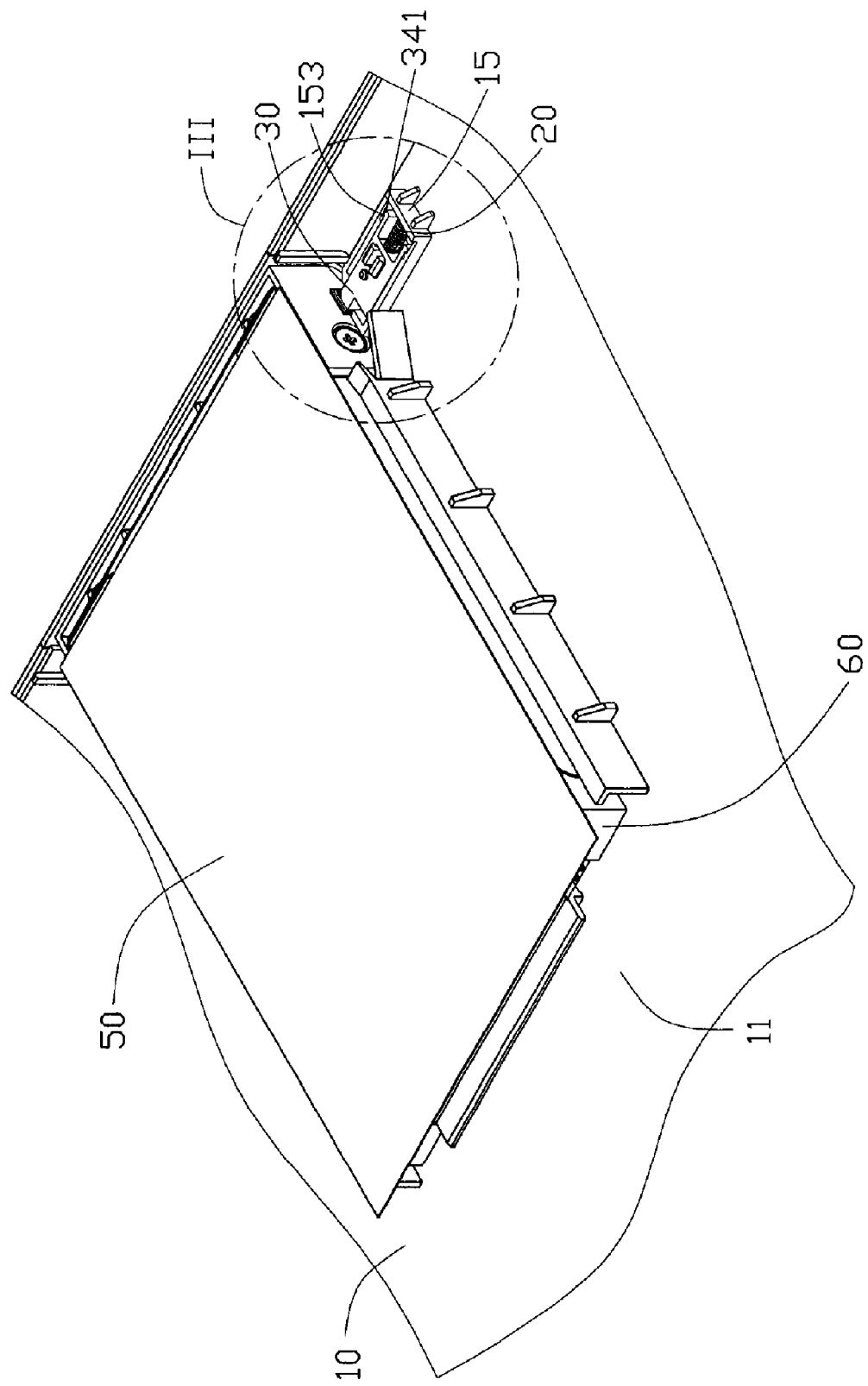
FIG. 2 is an assembled view of FIG. 1.
Figure 3:
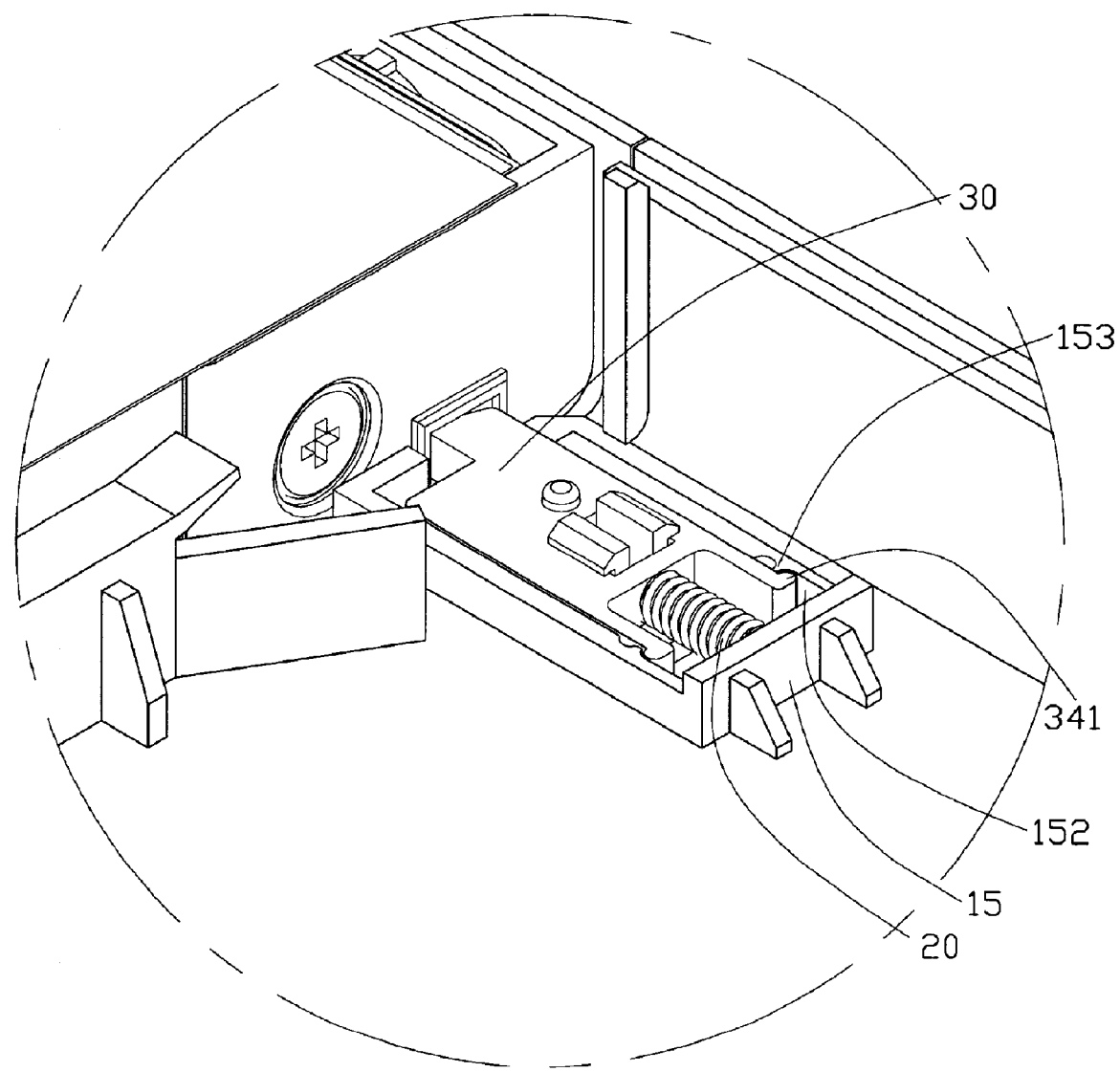
FIG. 3 is an enlarged isometric view of circled portion III of FIG. 2, in which a bracket is in a primary fixing state.

As shown in FIGS. 2 and 3, in assembly, the sliding member 30 and the elastic member 20 are received in the fixing portion 15. An end of the elastic member 20 receives the protruding post 35 of the sliding member 30 therein, and the other end of the elastic member 20 engages with the end of the fixing portion 15. The hooking portions 341 of the hooks 34 of the sliding member 30 are received in the sliding recesses 152 of the fixing portion 15 and engage with the projection 153 respectively. The ejector 31 protrudes from the fixing member 15. The latches 43 and the post 44 of the operating member 40 extend through the through hole 155 of the fixing member 15 from the bottom wall 11, and respectively extend through the latching portion 33 and the round hole 32 of the sliding member 30 to engage with the sliding member 30.

The storage device 60 is mounted in the bracket 50, and the bracket 50 with the storage device 60 is inserted into the base 10 along the sliding rails 13 from the end wall 12 of the base 10. The bracket 50 abuts against the ejector 31 of the sliding member 30 and pushes the sliding member 30 toward the end of the fixing portion 15, with the elastic member 20 compressed simultaneously. When the bracket 50 is slid until the receiving portion 513 aligns with the ejector 31 of the sliding member 30, the elastic member 20 is restored to push the sliding member 30 toward the bracket 50, and the ejector 31 of the sliding member 30 enters the receiving portion 513 of the bracket 50 to primarily fix the bracket 50, with the hooking portions 341 of the hooks 34 of the sliding member 30 engaging with the projections 153 of the fixing portion 15 in the sliding recesses 152 respectively.

Figure 4:
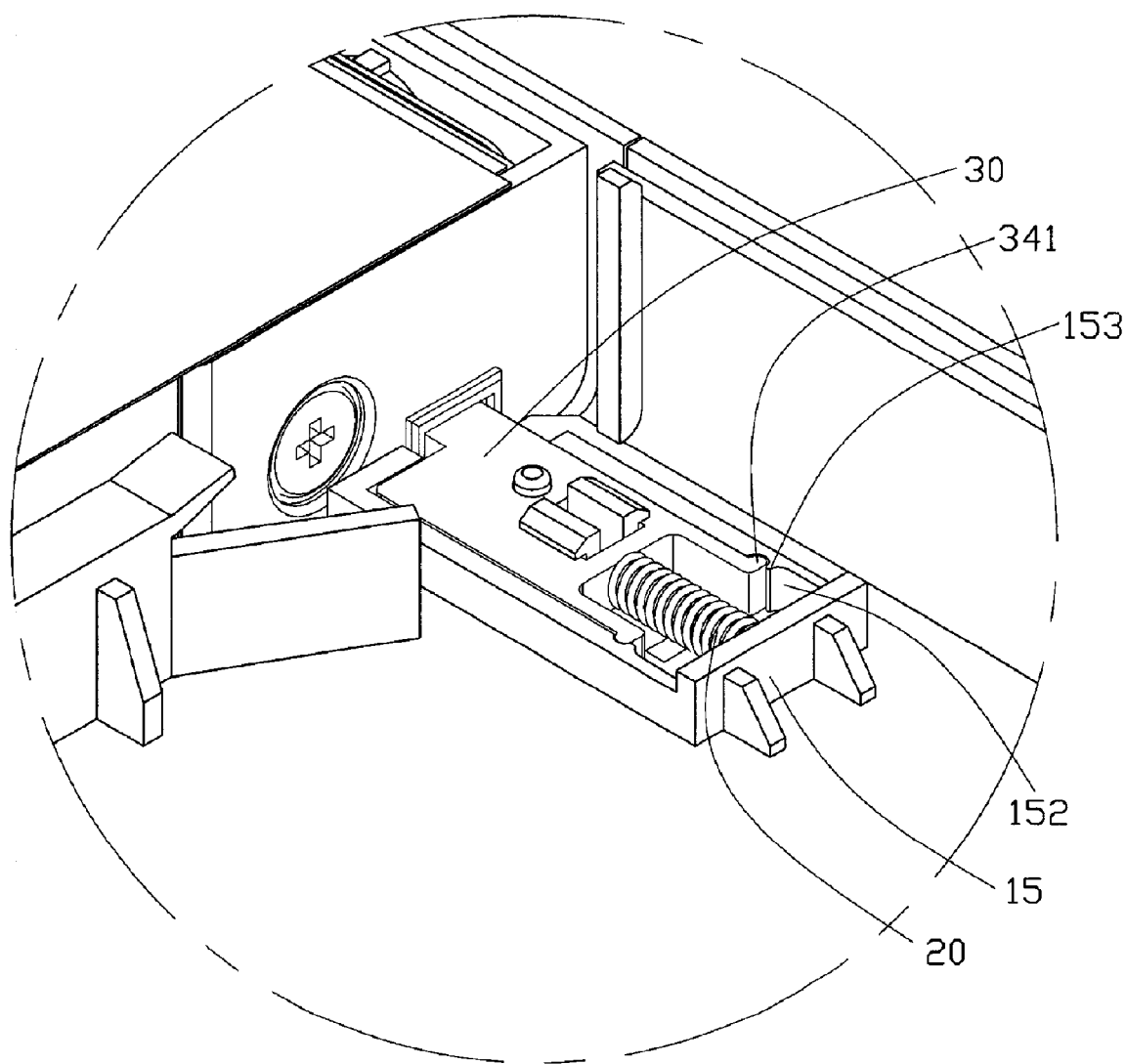
FIG. 4 is similar to FIG. 3, but the bracket is in a final fixing state.
Figure 5:
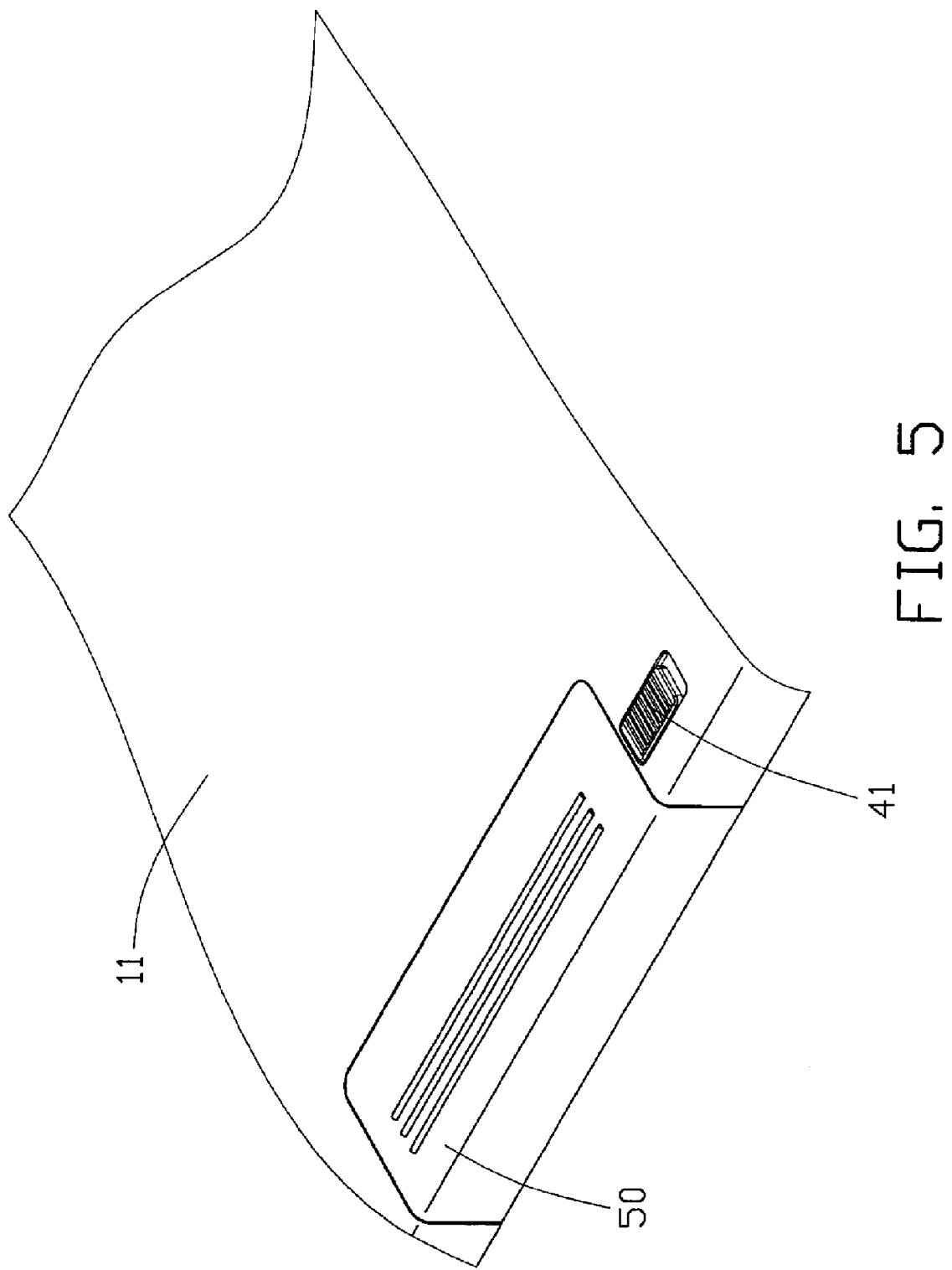
FIG. 5 is similar to FIG. 2, but viewed from another aspect, and the bracket is in a final fixing state.

As shown in FIGS. 4 and 5, pushing the operating panel 41 toward the bracket 50, the sliding member 30 slides with the operating member 40, and the hooking portions 341 of the hooks 34 of the sliding member 30 get over the projections 153 of the fixing portion 15 and engage in the hooking recesses 151 respectively. The bracket 50 is finally fixed.

Figure 6:
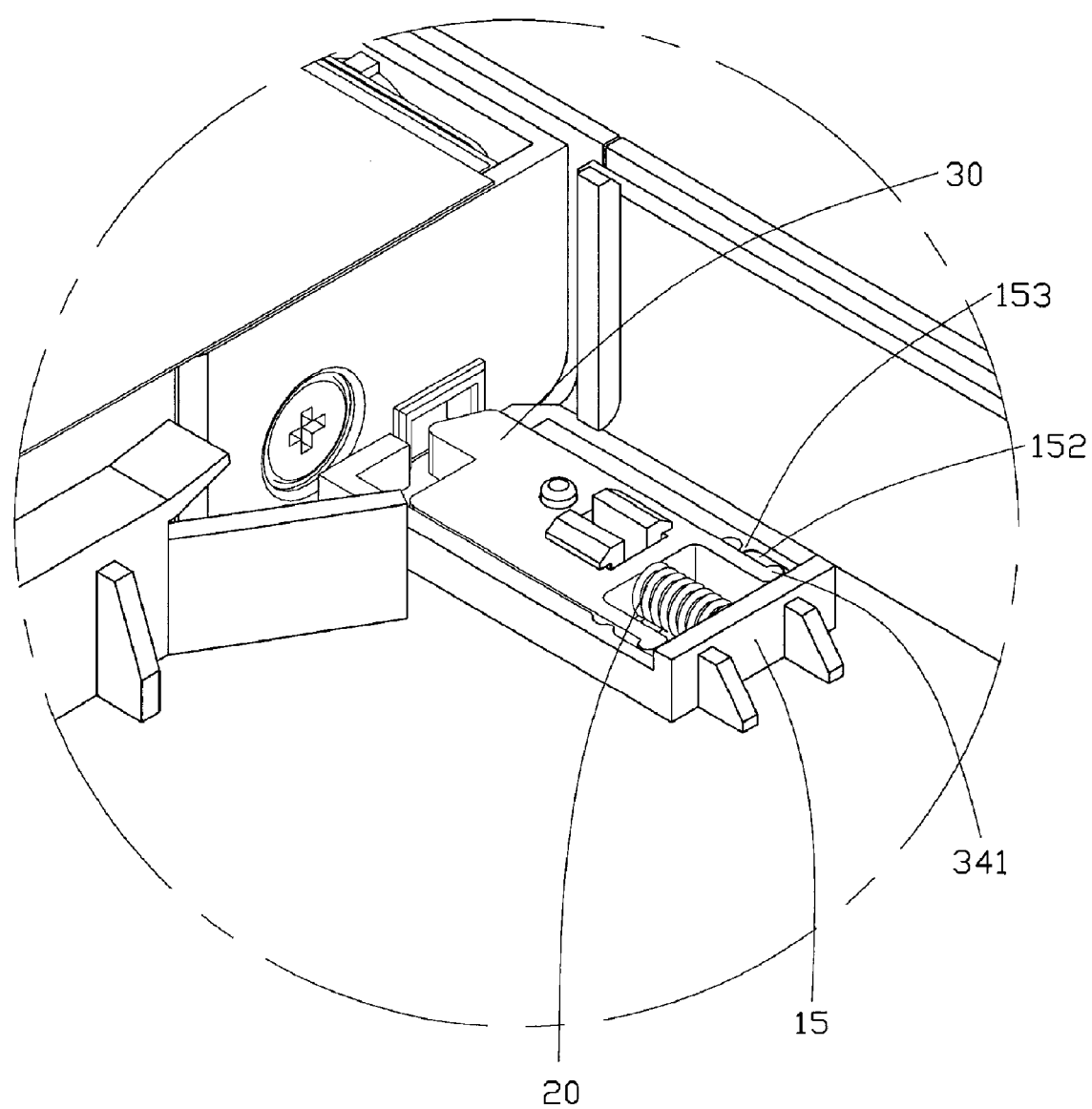
FIG. 6 is similar to FIG. 4, but the bracket is in a disengagement.

As shown in FIG. 6, to detach the bracket 50 from the base 10, the operating panel 41 is pushed away from the bracket 50. The sliding member 30 slides with the operating member 40, and compresses the elastic member 20. The hooking portions 341 of the hooks 34 of the sliding member 30 get over the projections 153 of the fixing portion 15 to engage in the sliding recesses 152 respectively, with the ejector 31 of the sliding member 30 partly exiting from the receiving portion 513 of the bracket 50. Pushing the operating panel 41 further, the hooking portions 341 of the hooks 34 of the sliding member 30 slide along the sliding recesses 152 toward the end of the fixing portion 15. When the ejector 31 entirely exits from the receiving portion 513, the bracket 50 with the storage device 60 can be taken out from the base 10.

In this embodiment, the elastic member 20 is a spring.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A mounting apparatus for a storage device comprising:
a bracket for receiving the storage device;
a base mounting the bracket therein, a fixing portion comprising two sidewalls formed on the base, and a hooking recess defined in one of the sidewalls of the fixing portion;
a sliding member received in the fixing portion to fix the bracket, and the sliding member comprising a hook to engage in the hooking recess of the fixing portion; and
an elastic member received in the fixing portion for restoring the sliding member,
wherein a sliding recess is defined in said one of the sidewalls of the fixing portion, and a projection is formed between the hooking recess and the sliding recess, the hook of the sliding member is capable of sliding in the sliding recess, getting over the projection and snappingly engaging in the hooking recess, such that the sliding member latches the storage device and is immovably locked to the base.

2. The mounting apparatus as claimed in claim 1, wherein a receiving portion is defined in the bracket corresponding to the fixing portion, and an ejector protrudes from the sliding member to engage the receiving portion.

3. The mounting apparatus as claimed in claim 1, wherein a protruding post is formed from the sliding member, an end of the elastic member receives the protruding post, and the other end of the elastic member engages with the fixing portion.

4. The mounting apparatus as claimed in claim 1, wherein the elastic member is a spring.

5. The mounting apparatus as claimed in claim 1, further comprising an operating member, wherein a through hole is defined in a bottom of the fixing portion, a latching portion is defined in the sliding member, and the operating member includes two latches extending through the through hole and the latching portion to engage with the sliding member.

6. The mounting apparatus as claimed in claim 5, wherein a hole is defined in the sliding member, a post is formed from the operating member to extend through the through hole of the fixing portion and engage in the hole of the sliding member.

7. A mounting apparatus for a storage device comprising:
a bracket for receiving the storage device;
a base mounting the bracket therein, a fixing portion comprising two sidewalls formed on the base, a hooking recess and a sliding recess defined in one of the sidewalls of the fixing portion; and
a sliding member received in the fixing portion to fix the bracket, the sliding member comprising a hook slidably received in the sliding recess, wherein the hook is capable of disengaging from the sliding recess and then engaging in the hooking recess of the fixing portion, the hooking recess retains the sliding member in a fixed position relative to the bracket.

8. The mounting apparatus as claimed in claim 7, wherein a portion is arranged to the bracket corresponding to the fixing portion, and an ejector protrudes from the sliding member to engage the portion of the bracket.

9. The mounting apparatus as claimed in claim 7, farther comprising an elastic member received in the fixing portion to restore the sliding member.

10. The mounting apparatus as claimed in claim 9, wherein the elastic member is a spring.

11. The mounting apparatus as claimed in claim 7, wherein a protruding post is formed from the sliding member, an end of the elastic member receives the protruding post, and the other end of the elastic member engages with the fixing portion.

12. The mounting apparatus as claimed in claim 7, further comprising an operating member, wherein a through hole is defined in a bottom of the fixing portion, a latching portion is defined in the sliding member, and the operating member includes two latches to extend through the through hole and the latching portion to engage with the sliding member.

13. The mounting apparatus as claimed in claim 12, wherein a hole is defined in the sliding member, a post is formed from the operating member to extend through the through hole of the fixing portion and enter the hole of the sliding member.

14. A mounting apparatus for a storage device comprising:
a bracket for receiving the storage device;
a base mounting the bracket therein, a U-shaped fixing portion formed on the base, the fixing portion comprising two straight parallel sidewalls and an end wall connected between the sidewalls away from the bracket, a hooking recess and a sliding recess indented in one of the sidewalls of the fixing portion, wherein the sliding recess is adjacent to the end wall, and the hooking recess is away from the end wall; and
a sliding member received in the fixing portion to fix the bracket, the sliding member comprising a hook slidably received in the sliding recess, wherein the hook is capable of disengaging from the sliding recess by getting over a section of said one of the sidewalls between the sliding recess and the hooking recess, and then engaging in the hooking recess of the fixing portion, such that the sliding member latches the storage device and is immovably locked to the base.

* * * * *